(12) United States Patent
Wason

(10) Patent No.: US 10,536,560 B2
(45) Date of Patent: Jan. 14, 2020

(54) SYSTEM AND METHOD FOR IMPLEMENTING AUGMENTED OBJECT MEMBERS FOR REMOTE PROCEDURE CALL

(71) Applicant: John Wason, New Windsor, NY (US)

(72) Inventor: John Wason, New Windsor, NY (US)

(*) Notice: Subject to any disclaimer, the term of this patent is extended or adjusted under 35 U.S.C. 154(b) by 75 days.

(21) Appl. No.: 15/918,388

(22) Filed: Mar. 12, 2018

(65) Prior Publication Data

US 2018/0270331 A1 Sep. 20, 2018

Related U.S. Application Data

(63) Continuation-in-part of application No. 14/485,222, filed on Sep. 12, 2014, now abandoned.

(60) Provisional application No. 61/877,366, filed on Sep. 13, 2013.

(51) Int. Cl.
*H04L 29/06* (2006.01)
*G06F 9/54* (2006.01)

(52) U.S. Cl.
CPC .............. *H04L 67/42* (2013.01); *G06F 9/548* (2013.01)

(58) Field of Classification Search
CPC .......... H04L 67/42; H04L 67/40; G06F 9/548
See application file for complete search history.

(56) References Cited

U.S. PATENT DOCUMENTS

| 9,491,261 | B1 | 11/2016 | Shagam et al. | |
| 9,602,329 | B1* | 3/2017 | Stehle | H04L 67/40 |
| 2003/0056030 | A1 | 3/2003 | Gao et al. | |
| 2004/0255048 | A1 | 12/2004 | Lev Ran et al. | |
| 2011/0087522 | A1* | 4/2011 | Beaty | G06Q 10/063 705/7.38 |
| 2011/0219112 | A1 | 9/2011 | Fagg et al. | |
| 2013/0064179 | A1 | 3/2013 | Attar et al. | |
| 2013/0212484 | A1 | 8/2013 | Joshi et al. | |
| 2013/0238552 | A1 | 9/2013 | Saib | |

OTHER PUBLICATIONS

John, D. Wason, Robot Raconteur® version 0.8: An Updated Communication System for Robotics, Automation, Building Control, and the Internet of Things, Aug. 2016, Proc. IEEE Conference on Automation Science and Engineering, pp. 595-602 (Year: 2016).*
John Wason, Robot Raconteur® using C++, Version 0.8 Beta, May 3, 2016, Wason Technology, LLC (Year: 2016).*

(Continued)

*Primary Examiner* — Wing F Chan
*Assistant Examiner* — Billy H Ng
(74) *Attorney, Agent, or Firm* — Loza & Loza LLP; Kevin L. Soules

(57) ABSTRACT

A communication method and system configured to facilitate integration of complex automation systems composed of disparate components that may run with different processes are distributed over a network or are embedded devices. The system/method allows for a client to rapidly access functionality exposed by a service within a client-service system employing a distributed application structure utilizing an augmented object-oriented model of multiple member types. The system/method allows interconnected nodes to communicate through message passing and remote procedure calling so as to reduce latency within a system composed of distributed resources.

13 Claims, 12 Drawing Sheets

(56) References Cited

OTHER PUBLICATIONS

Wason, J., "RobotRaconteur TM Introduction to Robot Raconteur® using Python," Version 0.5 Testing, http://robotractoneur.com, Aug. 15, 2014, 90 pages.

Wason, J. D. et al., "Robot Raconteur: A Communication Architecture and Library for Robotic and Automation Systems," Automation Science and Engineering (CASE), 2011 IEEE Conference on, Aug. 24-27, Triste, pp. 761-766.

Krzyzanowski, P., Remote Procedure Calls, Dec. 1, 2010, 5 pages.

Jeff Chase, Sockets and Client/Server Communication, Mar. 2, 2006, Duke University, https://users.cs.duke.edu/~chase/cps196/slides/sockets.pdf, 47 pages.

* cited by examiner

Node filtering
300

ServiceTypes – The desired types of the root object, or types that the root object implements. (Required)

Nodes – A list of NodeID – NodeName pairs that are desired. NodeID or NodeName may be empty to indicate a wildcard, but at least one must not be empty. A username and credentials can also be provided to authenticate against a specific node. (Optional)

TransportSchemes – The "schemes" allowed for the connection URL. These could be "rr+tcp", "rr+ws", "rrs+tcp", etc. This effectively selects what types of transports are allowed for connection to the service. (Optional)

Predicate – Pointer (or reference) to a function that receives a ServiceInfo2 structure and returns "true" to connect, or "false" if not. This allows for user-defined filter behavior. (Optional)

MaxConnections – The maximum number of clients to connect. This is intended to prevent resource exhaustion if too many services become available. (Required)
300

FIG. 15

SYSTEM AND METHOD FOR IMPLEMENTING AUGMENTED OBJECT MEMBERS FOR REMOTE PROCEDURE CALL

RELATED APPLICATION

The present application is a continuation in part of non-provisional application Ser. No. 14/485,222, titled "System and Method for Implementing Augmented Object Members for Remote Procedure Call," filed Sep. 12, 2014. Application Ser. No. 14/485,222 is incorporated herein by reference in its entirety.

Application Ser. No. 14/485,222 claims the benefit of priority under U.S. provisional application Ser. No. 61/877,366, filed on Sep. 13, 2013, which is incorporated by reference herein in its entirety.

FIELD OF THE INVENTION

Embodiments are related to distributed, client-server based systems. Embodiments are further related to a system and method for dynamically providing a fully functional object-oriented interface for a variety of programming languages.

BACKGROUND

Remote Procedure Call (RPC) is a computer implemented protocol for constructing distributed, client-server based applications by splitting functions between "client" tasks and "server" tasks performed by various computer resources that are organized into a network for communication with each other. RPC is premised on extending the notion of conventional or local procedure calling, so that the called procedure need not exist in the same address space as the calling procedure. The two processes may be on the same system, or they may be on different systems with a network connecting them. By using RPC, programmers of distributed applications may avoid the details of the interface with the network, thus making the client/server model of computing more powerful and user friendly. Networking applications that provide RCP functionality are fairly common and include CORBA, XML-RPC, COM, ActiveX, Java™ RMI, and .NET Remoting, to name a few. Most of these communication methods only provide function calls, properties, and sometimes service to client events, though Java™ RMI and .NET Remoting allow for object-oriented references and garbage collection.

These communication methods are typically intended for business applications and, thus, are designed to handle non-time critical data transfers. Thus, a need exists for improved communication methods in systems requiring time critical data transfers.

BRIEF DESCRIPTION OF THE FIGURES

FIG. 15 illustrates the various filter criteria used to filter nodes for subscriptions.

DETAILED DESCRIPTION

Figure 1:
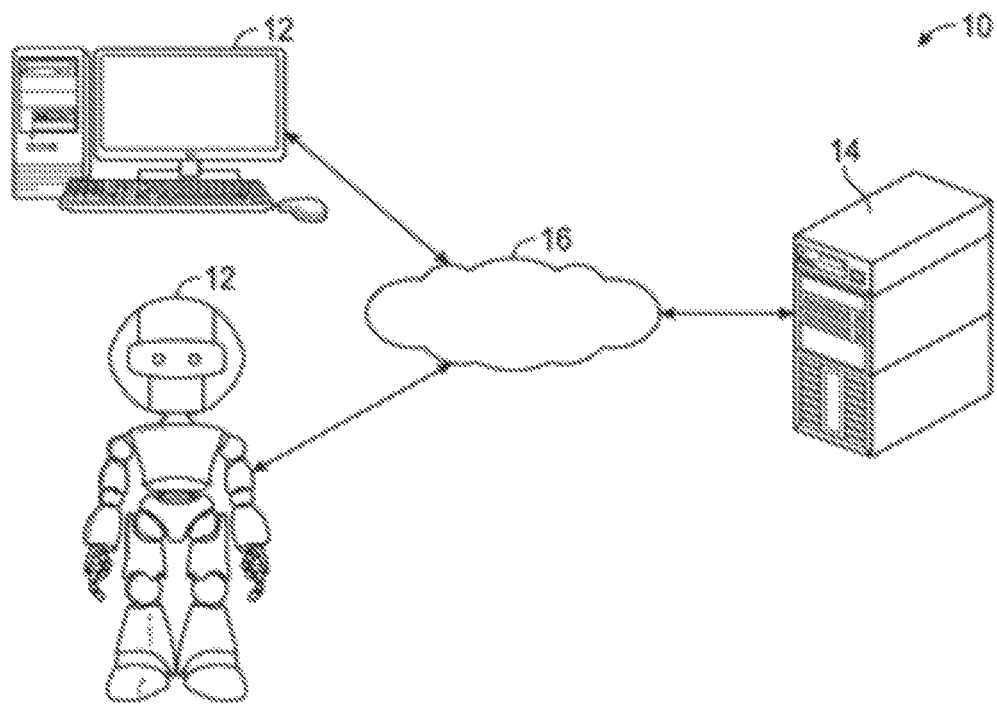
FIG. 1 illustrates an exemplary client-server system.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Unnecessary detail of known functions and operations may be omitted from the current description so as not to obscure the present invention. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosed embodiments provide for a unique communication architecture that may be used in systems containing distributed resources, such as sensors and actuators. Communication within these types of distributed systems can be challenging due to the variety of communication technologies and protocols used in the multitude of devices that may make up the system. Most currently available protocols are not typically supported across a large class of devices, software packages, and languages. This means it is often necessary to implement custom interface software which is time consuming and generally requires highly specialized programming. The disclosed architecture provides for implementation of a communication specification and reference libraries to achieve consistent, device and programming language neutral communication for a large class of devices while presenting a powerful interface that allows user software to ignore most of the communication specifics while remaining simple and compact enough to be easily extended to new devices or embedded systems. Another advantage of the disclosed embodiments is that it minimizes latency in systems where most, if not all, actions are critical in real-time and where specific a priori knowledge of the devices within the system may be unknown.

FIG. 1 illustrates an exemplary client-server system 10 composed of at least one client 12 and at least one service 14, in which disclosed embodiments may be implemented. Typically, a client-server system 10 employs a distributed application structure that partitions tasks or workloads between the providers of a resource or service (i.e., server) and service requesters (i.e., clients). A service 14 may execute one or more server programs which share resources with the client 12 upon request from the client 12. The client 12 and service 14 may be separate hardware systems that communicate via a network 16, such as the internet, but it should be noted that the client 12 and service 14 may also reside on the same hardware system. Typical hardware systems in which the client 12 and service 14 can also include components such as a processor, memory (e.g., random access memory (RAM), etc.), user input devices (e.g., keyboard, mouse, etc.), a graphical user interface and other components for data-processing, and user interaction where necessary. According to the exemplary embodiment depicted in FIG. 1, the client 12 and the server 14 are applications running on the respective hardware, wherein client 12 and server 14 exchange data via call messages and reply messages.

Figure 2:
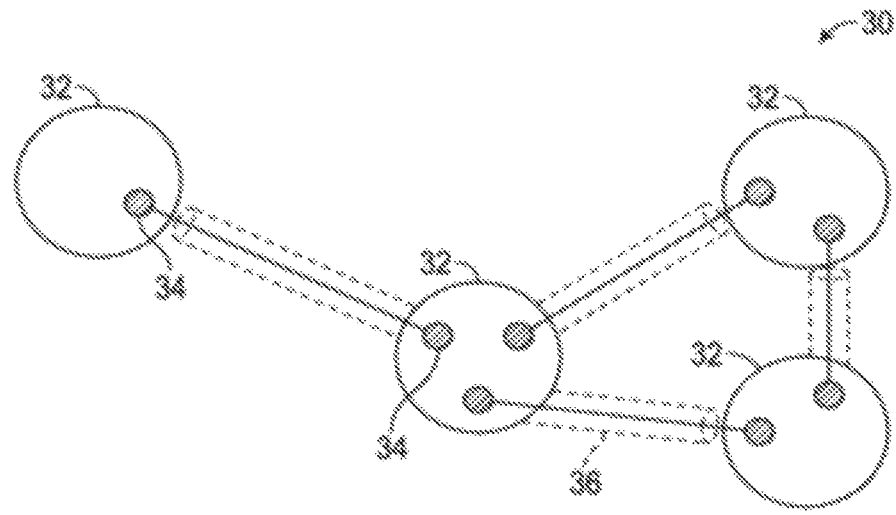
FIG. 2 illustrates a message passing layer that may be utilized by the client-server system.

FIG. 2 illustrates a message passing layer 30 that may be utilized by the client-server system 10 described in FIG. 1. The layer 30 includes independent nodes 32, which are processes running on a computer or embedded device. These nodes can be critical real-time, non-critical real-time, or event driven processes. Each node 32 can include endpoints 34 that uniquely connect to an endpoint 34 in another node 32. The nodes 32 function by sending messages from a starting endpoint 34 in one node 32 to an end endpoint 34 in another node 32 along a transport 36. The messages exchanged between nodes 32 contain routing information and data serialized in a specific format which is utilized by the nodes 32 to send the message through the correct channel 36.

Figure 3:
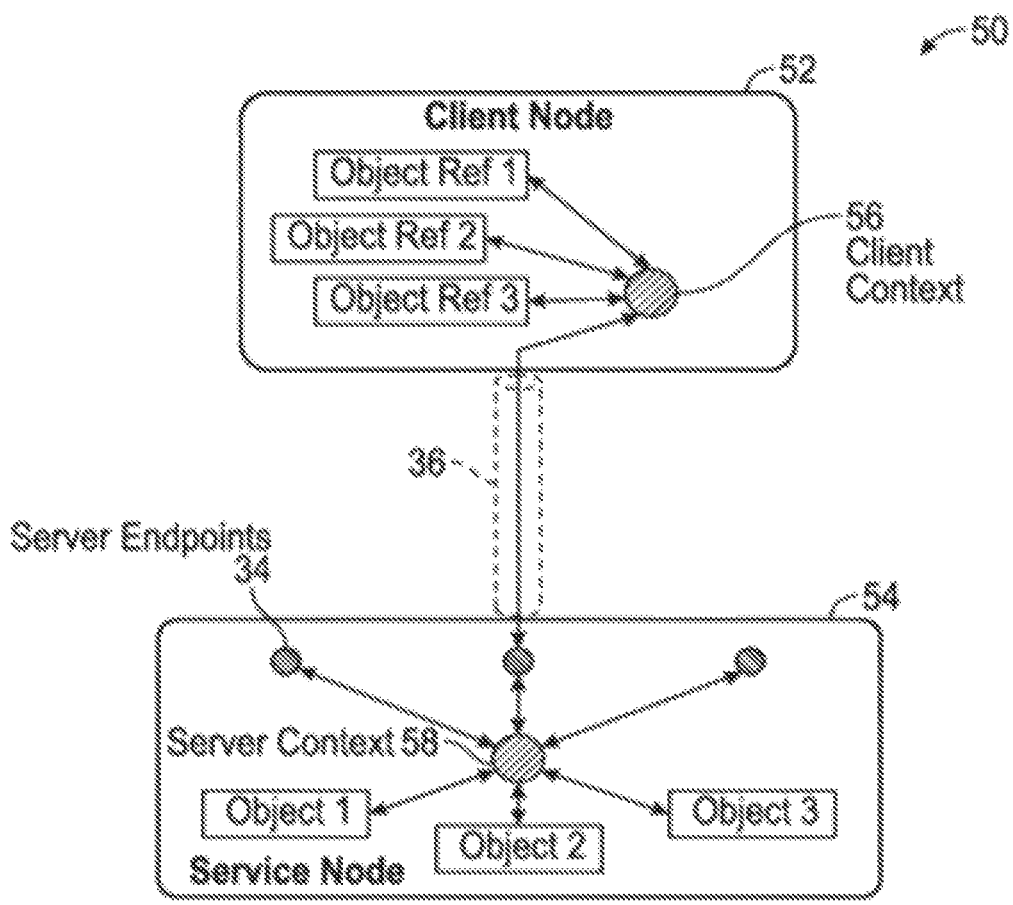
FIG. 3 illustrates an embodiment of the RPC layer that may overlay the message passing layer.

Typical RPC methods provide either simple functions or an object-based system with object members. Object members consist of the contents of the object and implement functionality. Current RPC methods typically have three types of members: functions, properties, and events. The disclosed embodiments provide an improved method of RPC, which consists of the message passing layer 30 and an RPC layer 50, which is shown in FIG. 3. This RPC layer 50 specifies the precise types of data and objects that can be exposed by utilizing an augmented object-oriented model that has a number of member types, including: functions, properties, events objrefs, pipes, callbacks, wires, and memories, the functionalities of which are described below.

The RPC layer 50 also utilizes value types, which are the data passed between a client and the service. Value types may be, but are not limited to, primitives, structures, maps, lists or multidimensional arrays.

FIG. 3 illustrates an embodiment of the RPC layer 50 that may overlay the message passing layer 30. The RPC layer 50 is composed of a client node 52 (i.e., a node implemented on the client) and a service node 54 in communication via a channel 36. The client node 52 can contain a client context endpoint 56 which is created when the client 12 connects to the service 14. The client context endpoint 56 is utilized as a client-specific object reference and has the ability to find object references, process transaction requests for functions, properties, and memories, dispatch events received from the service, create and manage client-side pipe endpoints, respond to callback requests, create and manage client-side wire connections, and process client-side wire peek/poke requests. The service node 54 may contain a service context 58 which manages an object and all its corresponding object references. The service node 54 may also contain endpoints 34 that are created for each client 12 connected to the service 14 as multiple clients 12 can be connected to a service context 58 at the same time. The endpoints 34 contained within the client 52 and service 54 nodes define connections between the nodes through channels, as depicted in FIG. 2.

Figure 4:
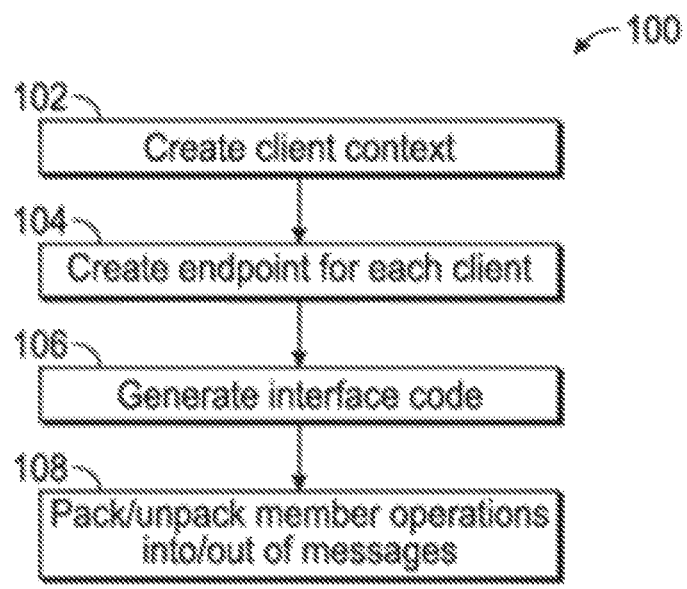
FIG. 4 illustrates a block diagram of a method of client-service communication via messaging and RPC layers.

FIG. 4 illustrates a block diagram of a method 100 of client-service communication via the messaging and RPC layers described in FIGS. 2 and 3, respectively. As shown in block 102, when a client connects to the service, an endpoint, also called a client context, is created within the client node which can be used for that client object reference. The service then creates an endpoint for each client connected to the service, as shown in block 104. In order to facilitate variation in member names and parameters between different types of objects, interface code is then automatically generated, as shown in block 106. This generated code takes member operations and parameters and packs or unpacks them into or out of messages being sent between client and service, as shown in block 108.

Figure 5:
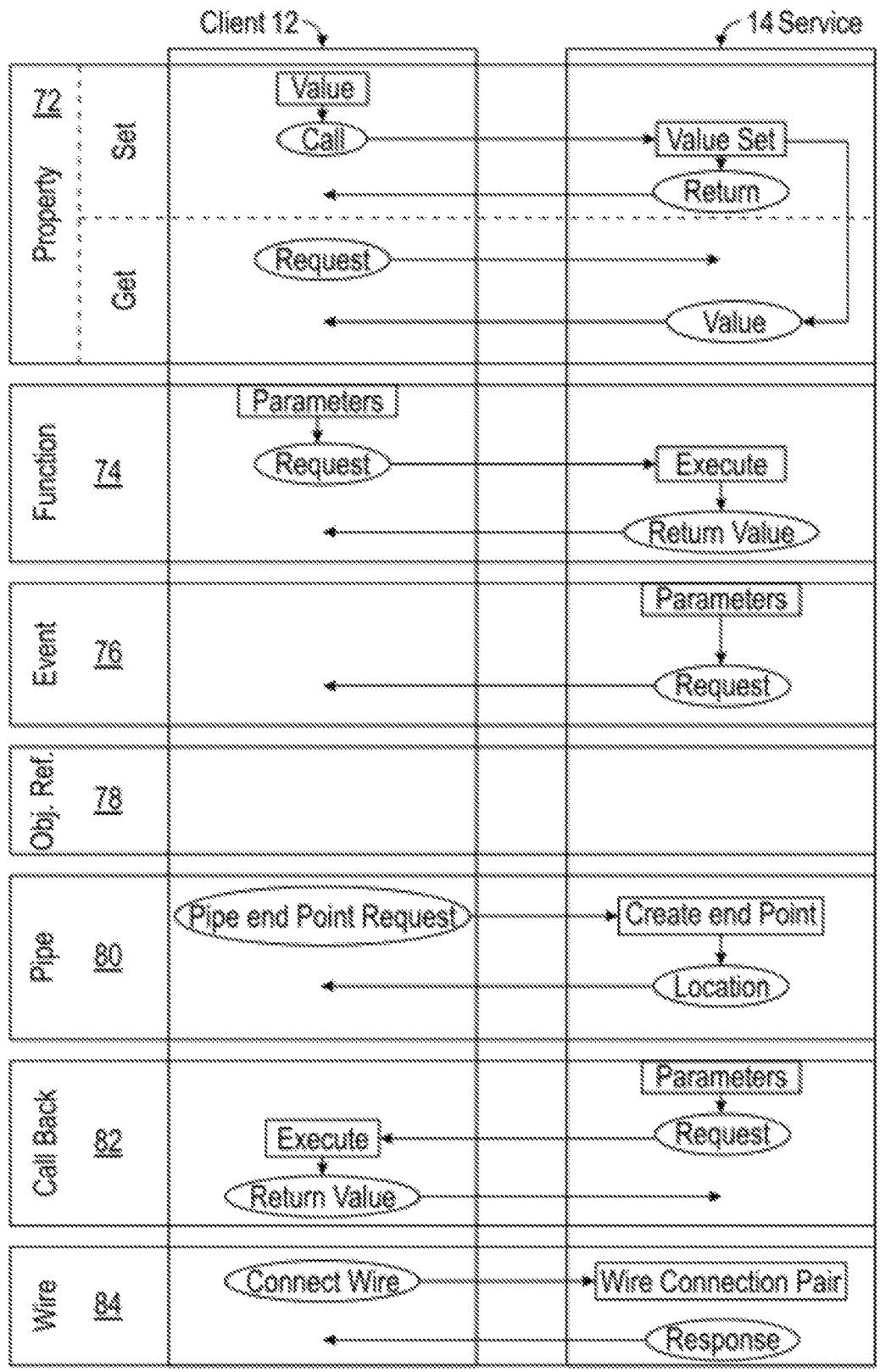
FIG. 5 illustrates various object members and how they implement functionality with the client-server system.

FIG. 5 illustrates an overview of the various object members and how they implement functionality within the client-server system.

Figure 6:
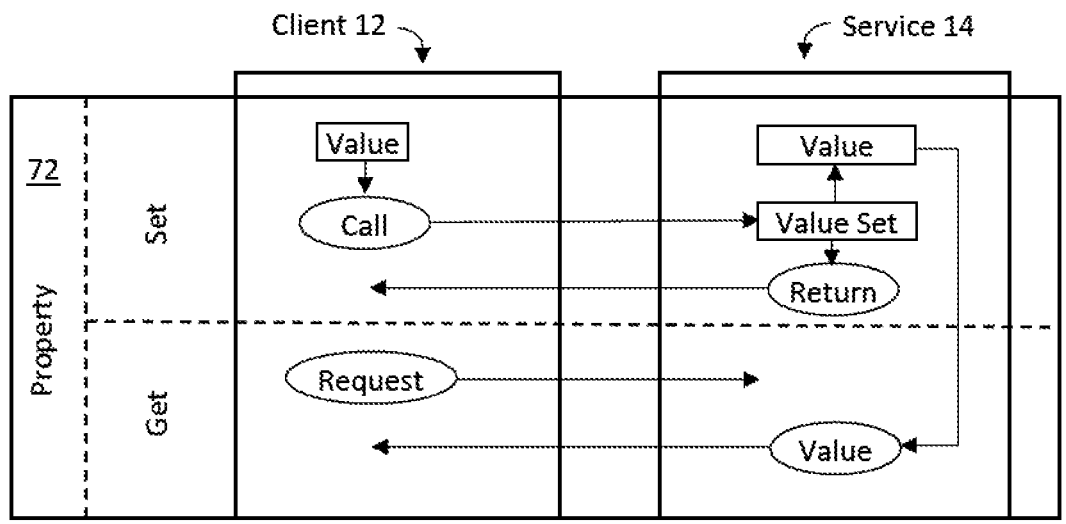
FIG. 6 illustrates how the "property" member implements functionality within the client-server system.

FIG. 6 illustrates the "property" member 72 and how it implements functionality within the client-server system 10. A "property" member 72 allows for the getting or setting of a variable value. During a set, the desired value is packed into a call message by the client 12 and sent to the service 14 where the value is set. A return message with no data is sent to the client 12. During a get, the client 12 sends a request message to the service 14. The service 14 returns a reply message containing the current value of the property. During either get or set, an error may be returned.

Figure 7:
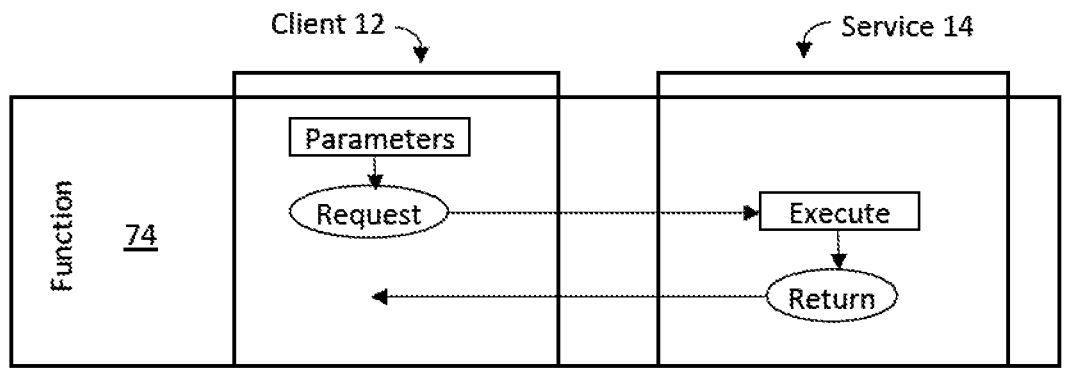
FIG. 7 illustrates how the "function" member implements functionality within the client-server system.

FIG. 7 illustrates the "function" member 74 and how it implements functionality within the client-server system 10. A "function" member 74 allows a function with zero or more parameters to be called and returns zero or one return value. The client 12 packs the parameters into a function request message which is sent to the service 14. The service 14 executes the function and packs the return value type (if applicable) into a function response message which is sent to the client 12. An error may also be returned.

Figure 8:
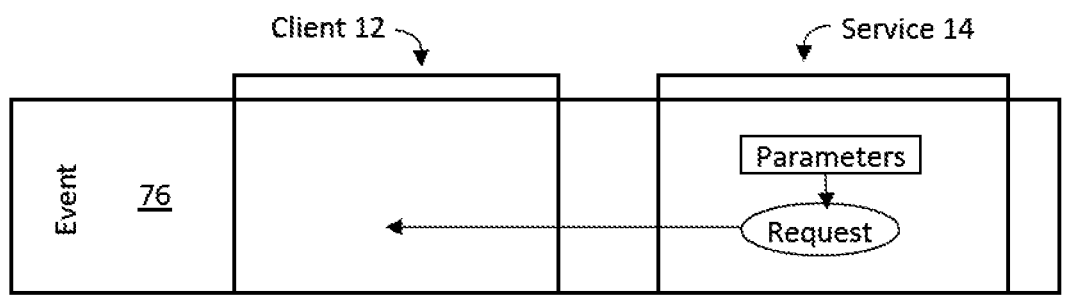
FIG. 8 illustrates how the "event" member implements functionality within the client-server system.

FIG. 8 illustrates the "event" member 76 and how it implements functionality within the client-server system 10. An "event" member 76 allows the service 14 to notify clients 12. Zero or more parameters are packed into an event request message which is then sent to all clients 12 currently connected to the object containing the event. There Is no error checking for the event.

Figure 9:
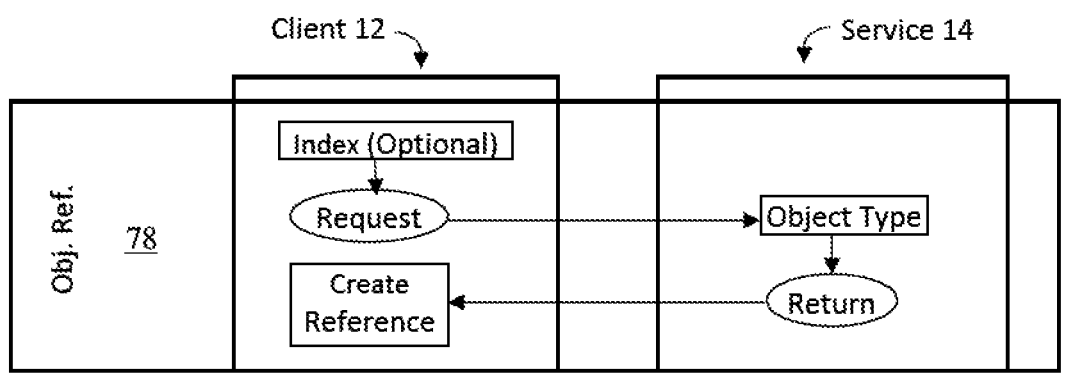
FIG. 9 illustrates how the "objref" member implements functionality within the client-server system.

FIG. 9 illustrates the "objref" member 78 and how it implements functionality within the client-server system 10. An "object reference" (objref) member 78 is used to retrieve object references to other objects within a service 14. A "service path" is used to address objects within a service 14. The objref 78 allows the client 12 to locate objects one level deeper in the path from the current object based on name and an optional index. The object reference 78 operates similar to a function, but returns an object reference instead of a value type.

Figure 10:
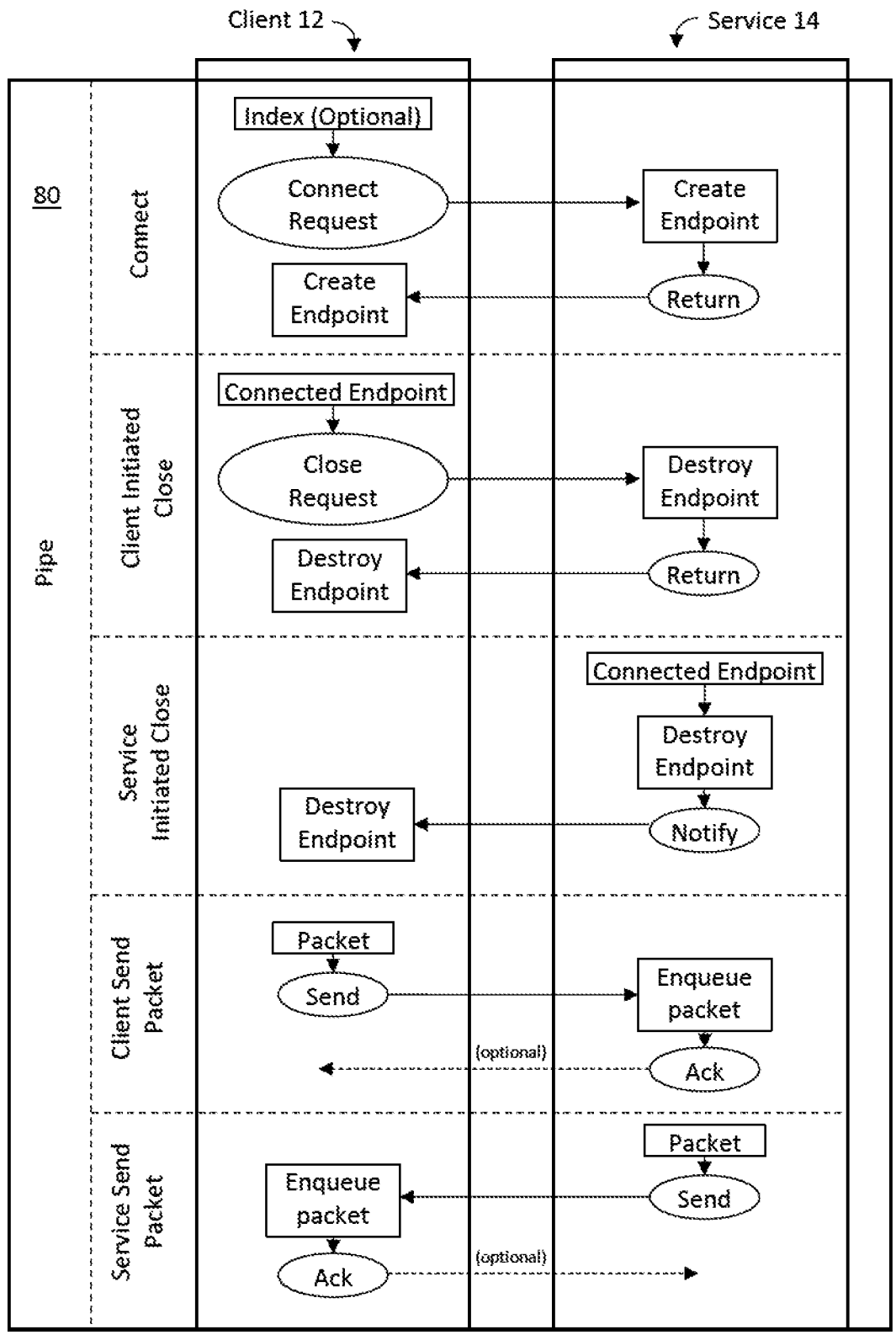
FIG. 10 illustrates how the "pipe" member implements functionality within the client-server system.

FIG. 10 illustrates the "pipe" member 80 and how it implements functionality within the client-server system 10. A "pipe" member 80 allows for transmitting packets either from client 12 to service 14 or from service 14 to client 12 in order. The pipe has at least four possible operations: "Connect", "Close", "SendPacket", and "SendPacketAck". The "Connect" operation is a transaction wherein the client 12 sends a connect request and the service 14 responds with a connected endpoint. A "PipeEndpoint" pair is created with one endpoint on the client 12 and one endpoint on the service 14. Endpoints created by a pipe member 80 are indexed.

The "Close" operation deletes this pair and can be initiated by either the client 12 or the service 14. If the client 12 initiates the close operation, a request close packet is sent to the service 14. The service 14 will delete its endpoint and send a response to the client 12. The client 12 will then delete its endpoint. If the service 14 initiates the close operation, it will first delete its endpoint and then send a notification message to the client 12. The client 12 will then delete its endpoint.

For the service 14 initiated close, the client 12 does not send a response to the notification. The "SendPacket" operation can be called by either endpoint and functions to queue the packet in the opposite endpoint's receive buffer. When an endpoint receives a packet, it can optionally generate a return packet using the "SendPacketAck" operation, which notifies the sender that the packet has been received. The "SendPacket" and "SendPacketAck" are not transactional and do not generate a return. The "SendPacketAck" operation is not called directly by the user, but is generated if the "SendPacketAck" option is set to "true" by the sending endpoint. The packets being transmitted are marked with a "RequestPacketAck" field that will cause the receiving endpoint to generate a "SendPacketAck." This return packet is optional and is typically used to implement flow control.

The following is an example of a pipe member 80 operation. Pipe endpoint pairs are identified within a pipe 80 by client 12 and an index that allows multiple pairs between client 12 and service 14. To create a pipe 80, a pipe endpoint "Connect" request is sent by the client 12. The service 14 creates an endpoint and returns to the client 12 where the paired endpoint is created and returned. Or, alternatively, an error may be returned. The client 12 can send a "Close" request to the service 14 or the service 14 can send a "Close" request to the client 12. Data packets are sent as a message that contains address information, the client, the index, the packet number, and the data. The packet number allows the pipe endpoint to reconstruct the correct packet order. For the pipe member, packets are packed in messages to transmit from client 12 to service 14 or from service 14 to client 12.

Figure 11:
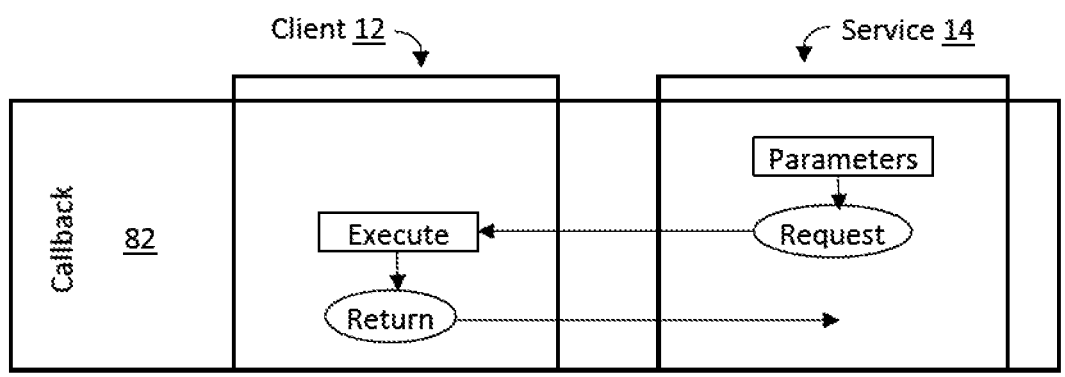
FIG. 11 illustrates how the "callback" member implements functionality within the client-server system.

FIG. 11 illustrates the "callback" member 82 and how it implements functionality within the client-server system 10. A "callback" member 82 allows for the service 14 to execute a function on the client 12. It is essentially the same as the function member 74 in reverse. The client 12 specifies the function that handles this callback. On the service side, the service 14 requests the function reference for a specific client 12 and calls the function. The zero or more parameters are packaged into a message which is sent to the client 12. The client 12 executes the function and returns zero or more return values to the service 14 in a response message. An error may also be returned.

Figure 12A:
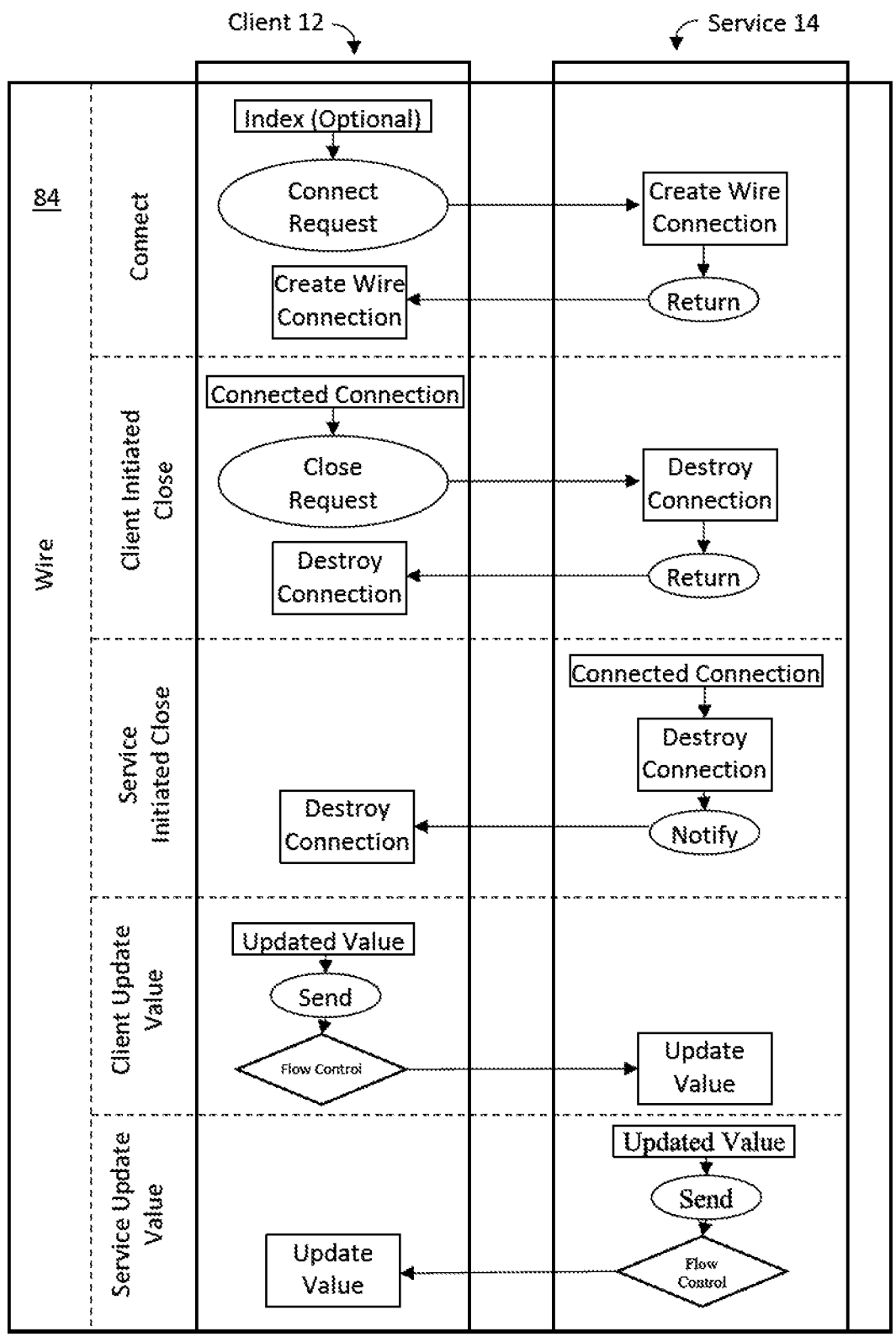
FIG. 12A illustrates how the "wire" member implements functionality within the client-server system.

FIG. 12A illustrates the "wire" member 84 and how it implements functionality within the client-server system 10. A "wire" member 84 provides the ability to communicate a constantly changing value where only the most recent value and the time the value was sent are important. It should be noted that a service 14 may have multiple wire connections to different clients 12, but unlike the pipe member 80, only one wire connection may be made per client 12. The wire member 80 is configured such that setting the "OutValue" of one endpoint causes the other's "InValue" to be updated, and vice-versa, resulting in the deletion of previous values or out of order values.

A wire member 84 connection may be initiated when a client 12 sends a request message to the service 14 to create a connection. The service 14 will either create a connection endpoint and send a success message, or return an error. Upon receipt of the success message, the client 12 will create a connection endpoint. A packet containing a value can then be sent either from client 12 to service 14 or from service 14 to client 12.

For example, when the "OutValue" of one endpoint is set, a packet with a timestamp is generated and placed into the send queue for the transport layer. If that same "OutValue" is set again before it is actually transmitted, the newly generated packet will replace the old packet in the queue. This packet dropping behavior happens at the transport level so it may happen at a relay point, for instance if "Node A" sends a packet to "Node C" with "Node B" acting as a relay, "Node B" may discard outdated wire data packets. Eventually a packet will be transmitted to the other connection endpoint. At this point, the new packet will be compared to the timestamp on the current value. If the timestamp on the most recently received packet is newer, it will become the new "InValue" for the endpoint. If it is not newer, it will be discarded.

In this way the wire provides a very efficient means for monitoring a constantly changing value such as the output of a sensor. Typically, these value packets do not generate returns and are not transactional.

Either the client 12 or service 14 may close the wire connection. If the client 12 initiates the close operation, a request close packet is sent to the service 14. The service 14 will delete its connection endpoint and send a response to the client 12. The client 12 will then delete its connection endpoint. If the service 14 initiates the close operation, it will first delete its endpoint connection and then send a notification message to the client 12. The client 12 will then delete its connection endpoint. For the service 14 initiated close, the client 12 does not send a response to the notification. For the wire member, packets are packed in messages to transmit from client 12 to service 14 or from service 14 to client 12.

Figure 12B:
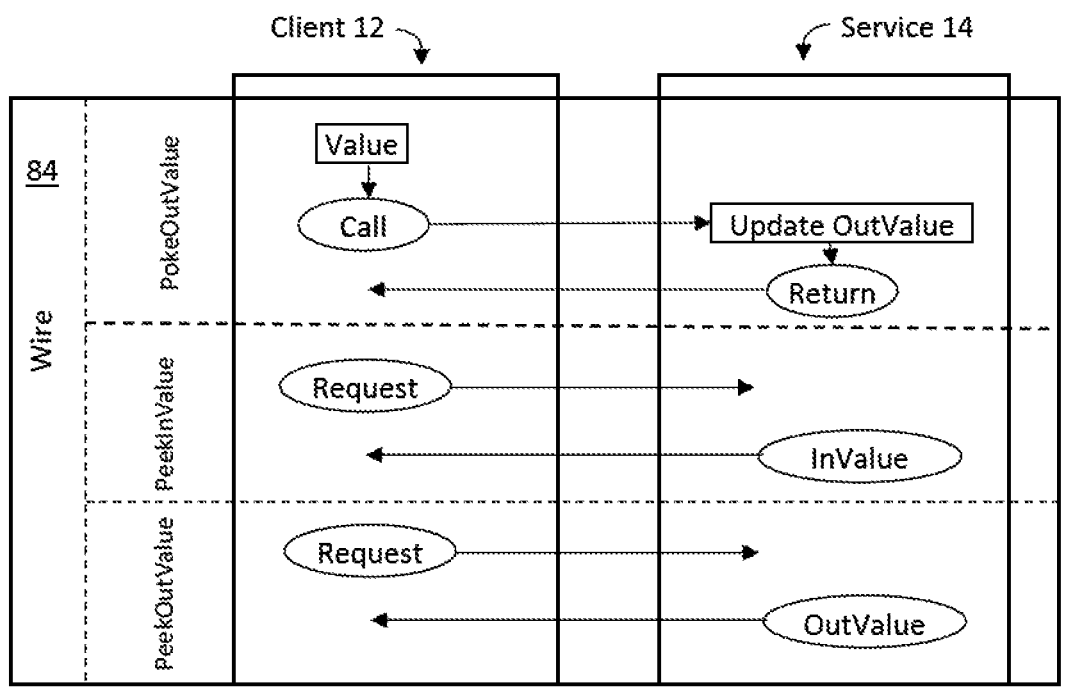
FIG. 12B illustrates how the "wire" member implements peek and poke functionality within the client-server system, as an extension to the standard capabilities of the "wire" member.

FIG. 12B illustrates the "peek" and "poke" operations for "wires." A "peek" operation is very similar to a "property" get request. During a "peek" operation, the client 12 will send a request message to the service 14. The service 14 will respond with a message containing the current value or will respond with an error. The "peek" operation can request either the "InValue" or the "OutValue." During a "poke" operation, the client 12 sends a request message to the service 14. The service will either return a success response message or return an error. These "peek" and "poke" operations are optional.

Figure 13:
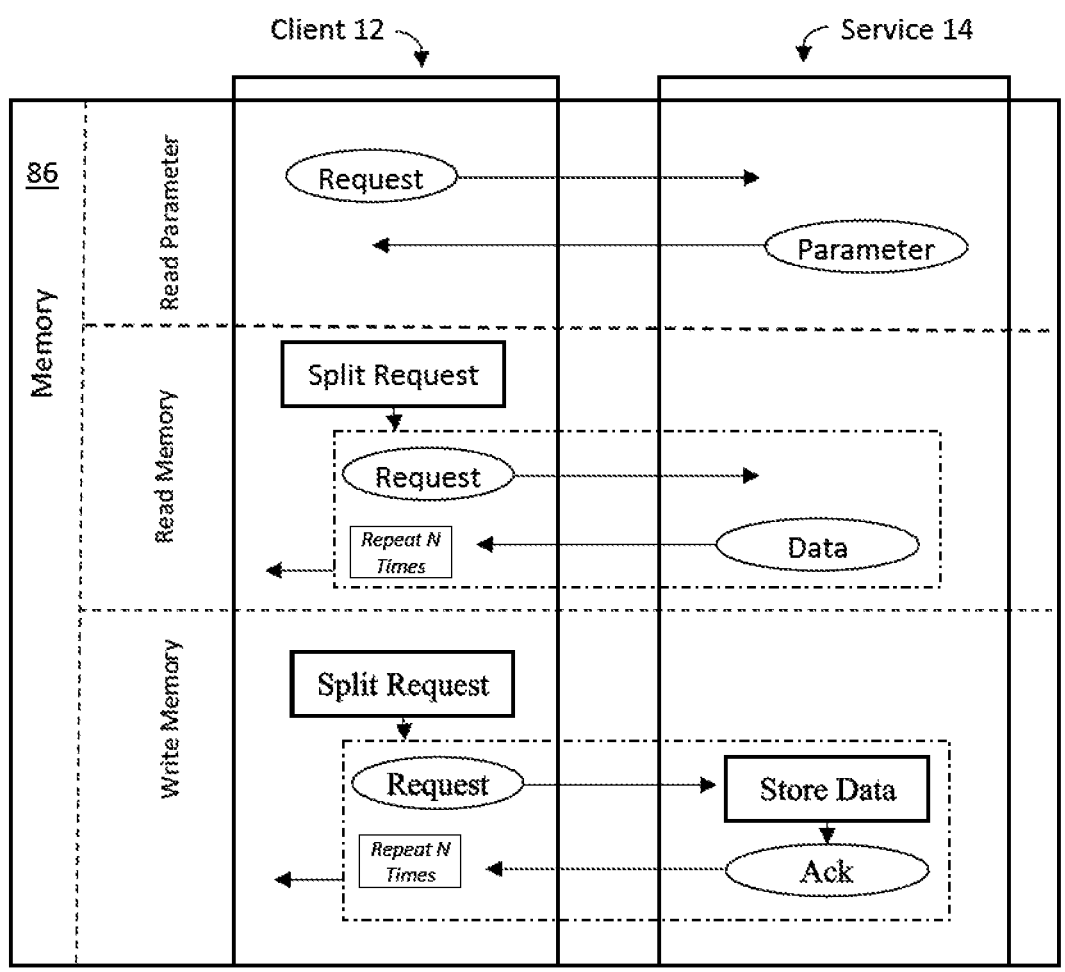
FIG. 13 illustrates how the "memory" member implements functionality within the client-server system.

FIG. 13 illustrates the "memory" member and how it implements functionality within the client-server system 10. A "memory" member 86 provides the client 12 the ability to read or write randomly accessible memory segments. The memory may either be a simple single dimensional array or a real/complex multi-dimensional array (not shown) within the client-server system 10. The memory reads the dimensions of the array and the complexity of the array (where applicable) by sending a request message with the requested parameter and the service 14 returns a response message containing the requested value. The client 12 can also request the maximum memory transfer size in bytes in the same manner. When a read or write is executed, the operation is broken down into multiple "chunks" of data. A message is sent from the client 12 either requesting a read or sending a write, and the service 14 responds with an acknowledgement message or a message containing the requested data. An error may also be returned. The maximum data "chunk" size may be limited to the minimum of the maximum memory transfer size of the client 12 and service 14.

The embodiments disclosed herein may be employed to facilitate the integration of complex automation systems composed of disparate components as described in "Introduction to Robot Raconteur™ using Python" (Aug. 15, 2014) and "Robot Raconteur. A Communication Architecture and Ubrary for Robotic and Automation Systems" by Dr. John Wason, both being incorporated by reference herein in their entirety.

In certain embodiments, the systems and methods disclosed herein can provide a communication system for robotics, automation, building control, and the "Internet of Things." The embodiments can aid in the rapid integration of complex systems consisting of components that differ in manufacturer, platform, interface, and application programming interface (API) language. The present embodiments provide "plug-and-play" connections, meaning that a client can receive all the type and command information required to communicate with a service at runtime. This results in an "instant-on" user experience, where fully featured object-oriented interfaces to the service are created dynamically upon connection with no additional effort by the user.

The embodiments thus provide a number of advantages including: automatic data type negotiation at runtime for dynamic languages and code generation for compiled languages (this allows for plug-and-play operation with minimal development effort); "Augmented Object Oriented" model that allows for transactional, streaming, and (soft) real-time communication both client-to-service and service-to-client; support for complex value data types with dynamic type negotiation; support for numerous hardware platforms and software languages; asynchronous operations; security using authentication and TLS; automatic node discovery; WebSocket support; WebBrowser client support; ASP.NET server support; and services that can accept multiple client connections.

It should be appreciated that embodiments disclosed herein do not necessarily require a master node. It is the combination of features and ease of use with automatic negotiation that provides a unique "Augmented Object Oriented" interface in combination with communication transports that provide secure transport over different technologies. The "Augmented Object Oriented" design indicates that objects have a number of types or "members" each providing unique functionality. Objects also have inheritance to provide forward and backward compatibility. The definitions of the object and data types are sent at runtime as a "Service Definition" allowing languages like Python, MATLAB, and JavaScript to dynamically provide client interfaces to services without any information about the service before the client connects.

In certain embodiments, "Transports" are used to communicate between "Nodes." The currently available transports are "TCP" for use with standard wired and wireless networking, "Local" for communication between programs running on the same computer, and "Hardware" for communicating with devices connected through USB, PCIe, Bluetooth, and industrial fieldbuses.

In certain embodiments, the core library associated with the systems and methods disclosed herein can be written in C++ using the Boost libraries and are capable of running on a number of platforms. The embodiments have minimal dependencies making them highly portable. It should further be understood that unlike other object-oriented RPC technologies such as Java RMI and .NET Remoting, the embodiments disclosed herein have a strong distinction between data and objects. In the embodiments disclosed, all objects are owned by the service, and the clients access them through "object references" or "proxies." Data can then be transferred between the client and the service using the objects "members." The description of what objects and data types are available in the service are described by "service definitions" that are transmitted to the client at the time of connection. This allows for dynamic "object references" to be generated using meta programming in, for example, Python, MATLAB, JavaScript, and other languages.

The embodiments disclosed herein can support a wide variety of data types, also referred to as "value types." The basic data types are called "primitives" and include floating point numbers of various precision, integers of various precision, and strings. Numeric primitives can be combined into arrays of single dimension or multiple dimensions. All data types can be combined into lists or maps. Maps can use integer or string keys. Structures are defined in service definitions and combine any data type (including other structures) into familiar organizational units. Finally, the "varvalue" keyword can be used to allow any allowed data type to be transmitted or received with its type determined at runtime.

An object, as discussed herein, generally describes a collection of members that provide functionality acting on the object. The embodiments disclosed herein use an augmented "Object Oriented Model" that has a set of defined member types. These member types are necessary to address latency in communication that exists between a client and service. Certain characteristics of such member types are provided below.

Properties (identified by keyword: "property") can be similar to class variables (field). They can be written to (set) or read from (get). A property can take on any value type.

Functions (identified by keyword: "function") can take zero or more value type parameters and return a single value type. The parameters of the functions must all have unique names. The return value of the function may be void if there is no return.

Events (identified by keyword: "event") can provide a way for the service to notify clients that an event has occurred. When an event is fired, every client reference receives the event. The parameters are passed to the client. There is no return.

Object References (identified by keyword: "objref") service can comprise any number of objects. The root object can be the object first referenced when connecting to a service. The other object references are obtained through the objref members. These members return a reference to the specified object. Because the embodiments provide a strong distinction between data and objects, only an objref can return a reference to another object. objref can be defined as a specific type or have type "varobject" which is determined at runtime.

Pipes (identified by keyword: "pipe") can provide full-duplex first-in, first-out (FIFO) connections between the client and service. Pipes are unique to each client and are indexed so that the same member can handle multiple connections. The pipe member allows for the creation of "PipeEndpoint" pairs. One endpoint is on the client side, and the other is on the server side. For each connected pipe endpoint pair, packets that are sent by the client appear at the service end, and packets that are sent by the service end up on the client side. Pipes are useful for streaming data where each packet is important. It can also be used to transfer large amounts of data in sequential packet form. If only the most current value is needed, a "wire" member can be used instead.

Callbacks (identified by keyword: "callback") can be essentially "reverse functions," meaning that they allow a service to call a function on a client. Because a service can have multiple clients connected, the service must specify which client to call.

Wires (identified by keyword: "wire") can be very similar to pipes, however, rather than providing a stream of packets the wire is used when only the "most recent" value is of interest.

Memories (identified by keyword: "memory") provide random read and/or write access to large arrays of fixed or floating point numbers. The array can be single or multidimensional. Memories are different than properties because a memory can read or write just a subset of data, and if necessary transfer the data in multiple messages to avoid message size limitations of transports. Properties transfer the entire value in one message, which can be problematic for large arrays of numbers.

The embodiments can support a wide variety of data types, also referred to as "value types." As noted, the basic data types are called "primitives" and can comprise of floating point numbers of various precision, integers of various precision, and strings. Numeric primitives can be combined into arrays of single dimension or multiple dimensions. All data types can be combined into lists or maps. Maps can use integer or string keys. Structures are defined in service definitions and combine any data type (including other structures) into familiar organizational units. Finally, the "varvalue" keyword can be used to allow any allowed data type to be transmitted or received with its type determined at runtime.

The embodiments also have support for inheritance and importing existing service definitions and using the imported types. This allows for forward and backward compatibility. Newer devices can add members while maintaining compatibility with an existing object type. If a client connects that does not understand the new object type, it can fall back to the older data type and still communicate with the device. This functionality also allows for the addition of vendor-specific features while maintaining compatibility with a widely understood standard object type.

In certain embodiments, the functions in the disclosed core library that block during network activity can also run in asynchronous mode. When using the asynchronous mode, the command is started and provided with a handler function. The current thread will then return immediately. Once the activity has been completed, the handler function is called using a thread from the thread pool. Most object members can be used asynchronously where blocking would result due to network activity. Because of this asynchronous design, the methods and systems can interface with numerous nodes simultaneously with limited usage of computational resources.

The embodiments can use pluggable transports to connect nodes. Supported transports include TcpTransport, LocalTransport, and HardwareTransport. The TcpTransport provides connection over standard network technology using IPv4 or IPv6. Auto-discovery is implemented using UDP. The TCP transport can be secured using TLS to prevent eavesdropping and to verify node identity. The TCP stream is upgraded after connection to TLS using StartTLS to trigger the upgrade. TLS uses X509 certificates to validate the identity of the nodes. These certificates can be tied to a 128-bit UUID.

By checking the certificate, a client can determine that the service is the expected device. The certificates can also be used to verify client identity to provide strong certificate based authentication. The TcpTransport can also create and accept WebSocket connections. WebSockets are an HTTP feature that allow for persistent connections between clients and HTTP servers. They are supported by standard web browsers and web servers. By using the WebSocket support, standard web browsers that support HTML5/JavaScript can conned to the nodes disclosed herein, listening for TCP connections. Clients can then be developed using pure JavaScript. JavaScript programs have the advantage of being easier to deploy and highly compatible with different platforms, including mobile devices. Using WebSockets, it is also possible to embed a service as disclosed herein, inside an ASP.NET web server. ASP.NET is capable of accepting WebSockets. These WebSockets can then be passed to the node to be accepted as an incoming client connection. The use of WebSockets allows the embodiments disclosed herein to be compatible with existing web technology.

The LocalTransport is used to communicate between nodes on the same machine. It uses operating system level inter-process communication (IPC) methods and does not use the loopback networking interface. The HardwareTransport allows communication with USB, PCIe, Bluetooth, and industrial devices.

The embodiments disclosed herein assist in the development of a number of complex systems involving multiple devices developed by different vendors connected to computers in a network. The computers can run a variety of operating systems and the drivers for these devices are available in a variety of languages. These systems rapidly evolved and the communication interfaces between subsystems constantly change. The disclosed embodiments can provide compatibility between devices whenever possible.

For example, the embodiments disclosed herein are capable of running on Windows, Linux, Mac OSX, iOS, Android, and HTML5/JavaScript on a variety of processor architectures. The embodiments can be effectively run on the Raspberry Pi, which is used as a wireless sensor interface. The embodiments support C++, C #, Java, Python, and JavaScript programming languages. In certain embodiments, the disclosed systems and methods can run on the Arduino microcontroller family and Particle Photon wireless microcontroller using a custom bare-metal implementation, providing the opportunity for low cost, low power devices.

The library as disclosed herein is capable of either soft real-time or hard real-time communication utilizing the "wire" element depending on the specific implementation of the embodiments disclosed. The "wire" element will transmit the most recent value to the connected node. The communication can be both client-to-service and service-to-client.

As previously noted, the embodiments disclosed herein include objects which contain various member types, including the "wire" member type that communicates a constantly changing value by sending timestamped packets either client to service or service to client. This packet based communication can ensure that the opposite endpoint will have the latest value, however, this update frequency is often unnecessary if only a single sample is required. To improve the efficiency of reading or writing a single sample, three additional operations can be implemented for clients without forming a connection.

The first is "PeekInValue." This operator can read the current "InValue" for the client 12 by requesting it from the service 14. The second is "PeekOutValue" which can read the current "OutValue" for the client, as received by the service, by requesting the current value from the service. Third, the "PokeOutValue" can write the current "OutValue" for the client, by requesting the service update the "OutValue." "PeekInValue," "PeekOutValue," and "PokeOutValue" use a reliable request—response method to read or write the value similar to the way "properties" access the service. This is illustrated in FIG. 12B.

The "InValue" and "OutValue" directions for peek and poke operations, as described herein, correspond to the client WireConnection, but operate directly on the wire member without the need to form a connection. These commands operate similar to a "property" operation, where a request is made by the client and a response sent by a service. For the "peek" operations, the service return contains the current value. For the "poke" operations, the client request contains the new value. These operations do not require creating a wire connection; they operate as a side channel for when a single sample is necessary. The "peek" and "poke" operations can be optional and can be required when the capability is advantageous.

Figure 14:
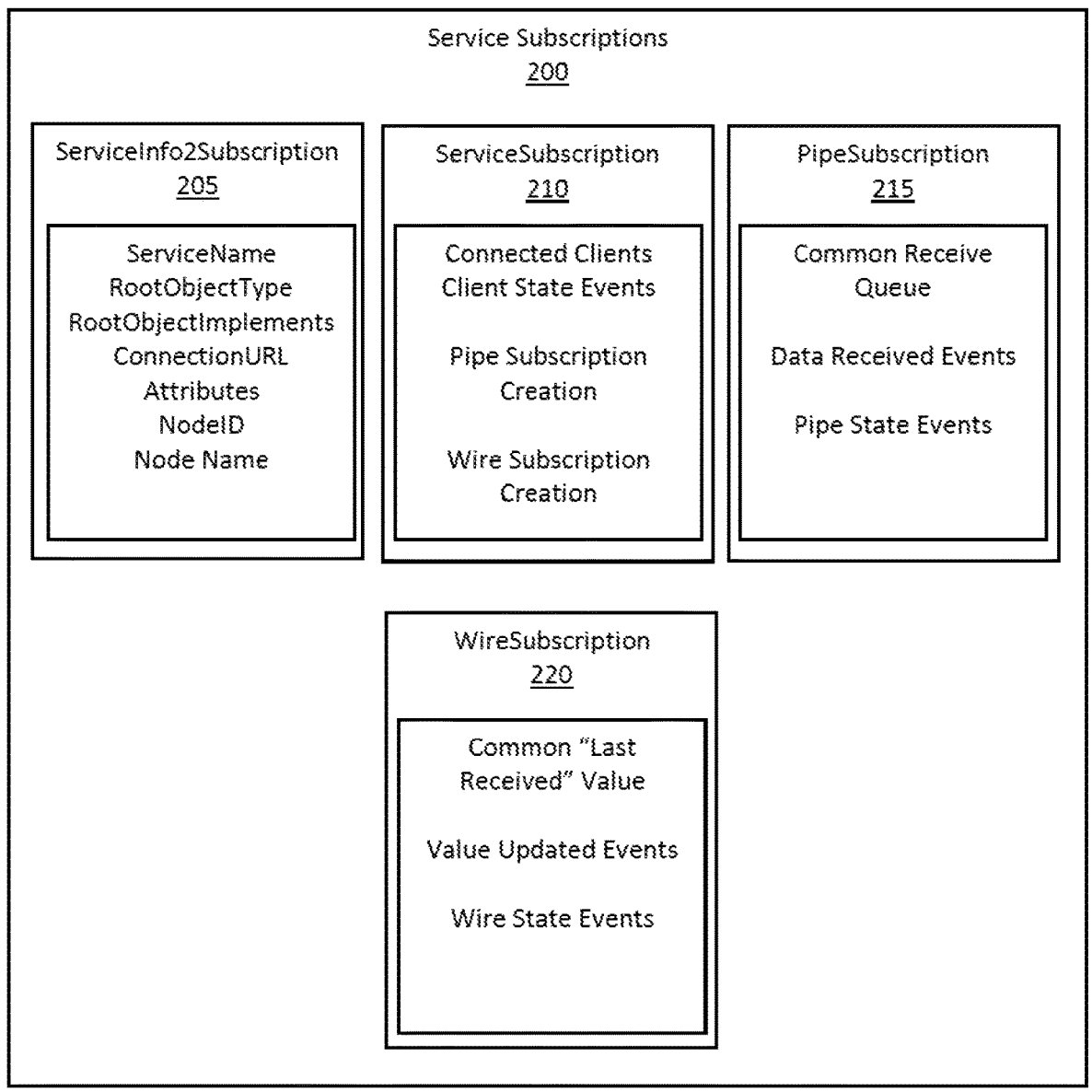
FIG. 14 illustrates the capabilities of the various service subscription types.

In certain embodiments, illustrated in FIG. 14, service subscriptions 200 can be implemented. Publish/Subscribe (PubSub) is a method for sending data between functional units without focus on the lifecycle management of the underlying connections. In certain embodiments, "Service Subscriptions" 200 are provided that allow clients to subscribe to services in several different ways.

In one embodiment, a "ServiceInfo2Subscription" 205 can be used to track when services become available, provide notifications for when services are detected/lost, and provide a list of all detected services based on filter criteria. The subscription tracks information about the service in the ServiceInfo2 structure as follows:

ServiceName—The name of the service.
RootObjectType—The type of the root object in the service as defined in a service definition file.
RootObjectImplements(s)—Any additional object types that the service implements, allowing polymorphism for backwards compatibility and standardization of common types.
ConnectionURL(s)—A list of URLs that can be used to connect to the service.
Attributes—A map of string—value pairs that provide metadata for the node.
NodeID—The 128 bit UUID of the node hosting the service.
NodeName—The plain text name of the node.

In an embodiment, "ServiceSubscription" 210 connects to all services that match filter criteria. This provides notifications for connection/disconnection and provides connected clients so that they can be utilized directly. The ServiceSubscription also allows for clients to "claim" a client connection so that the ServiceSubscription will not disconnect the client. The client can be "released" back to the control of the ServiceSubscription when no longer needed.

In another embodiment, a "PipeSubscription" 215 can be created through the ServiceSubscription by requesting a subscription to a specific pipe member of all clients the ServiceSubscription connects. The ServiceSubscription will "Connect" to all pipe members with the specified name and will return all packets received to a common queue. The PipeSubscription can also send a packet to all connected pipes using "SendPacketAll." This allows for a client to broadcast data to multiple services with matching pipes. Notifications are optionally provided for when the pipe connects/disconnects, and when a pipe data packet has been received.

Finally, a "WireSubscription" 220 is provided which is similar to PipeSubscription, but for wires. The WireSubscription will "Connect" to all wires and track the most recent value received. WireSubscriptions all have the "SetOutValueAll" which will set the same "OutValue" for all connected wire connections. Notifications are optionally provided for when the wire connects/disconnects, and when a wire data packet has been received. Note that the new "peek" and "poke" operations are not used by WireSubscription.

When any of the four subscription types are destroyed, all connections can be closed unless they have been "claimed." The "Service Subscriptions" are based around the node discovery system built into the claimed methods and systems.

There are several steps to discovery. First, the URL for a node is detected with a NodeID, NodeName, and ServiceNonce. There are several ways to detect a node: 1) a UDP packet is received from the network. This packet is either sent periodically, or is requested by sending a detection request UDP packet if the period is longer than desired. The UDP packet must be sent at least every 60 seconds to prevent cache expiration; 2) a small file, registry key, or other local data store contains the discovery data. The creation of the node data can be monitored, for example, using file creating monitoring; 3) a hardware device connects or disconnects, and triggers notification that a new node is available/lost. How this is accomplished is specific to each hardware type; 4) any other unforeseen method for notifying a state change.

The next step is to compare the NodeID, URL, and ServiceNonce to the current cache. If this NodeID has not been detected, the process continues to the next step. If NodeID has been detected already but ServiceNonce has changed, rerun the next step. If the next step failed last time, retry the next step with new data after a backoff period. (The ServiceNonce is a short random string that is changed whenever the services available or other state information changes on the node. This will force the client to refresh its cache in the next step.)

The next step is to connect to RobotRaconteurServiceIndex using URL(s) of the detected node. There may be multiple URLs for each node, so try all to find one that is successful. If connection fails, retry up to N times, typically 3 with increasing backoff to prevent connection attempt flooding. After N times, abort connection attempt until another discovery packet is received. If connection is successful, retrieve the ServiceInfo2 structure from RobotRaconteurServiceIndex. Disconnect from RobotRaconteurServiceIndex. Store ServiceInfo2 structure in node cache.

Subscriptions are then notified that a client has connected. If a discovery packet has not been received for 60 seconds, the node data is expunged until step 3 is completed again.

The node discovery system provides a list of ServiceInfo2 structures to ServiceInfo2Subscription and ServiceSubscription. These detected nodes need to be filtered to determine if they are relevant to the subscription. FIG. 15 illustrates the filter 300 which contains these criteria:

ServiceTypes—The desired types of the root object or types that the root object implements. This criterion is not optional.

Nodes—A list of NodeID—NodeName pairs that are desired. NodeID or NodeName may be empty to indicate a wildcard, but at least one must not be empty. A username and credentials can also be provided to authenticate against a specific node. This criterion is optional.

TransportSchemes—The "schemes" allowed for the connection URL. For instance, these could be "rr+tcp," "rr+ws," "rrs+tcp," etc. This effectively selects what types of transports are allowed for connection to the service. This criterion is optional.

Predicate—Pointer (or reference) to a function that receives a Serviceinfo2 structure and returns "true" to connect, or "false" if not. This allows for user-defined filter behavior. This criterion is optional.

MaxConnections—The maximum number of clients to connect. This is intended to prevent resource exhaustion if too many services become available. This criterion is required.

ServiceInfo2Subscription will simply notify the subscription user if the detected node matches the filter criteria. ServiceSubscription will connect immediately if the filter criteria matches. It should be noted that the "user" in this context means user of the software library, not the human computer user.

In another embodiment, certain members can be "readonly"/"writeonly" by clients. This is necessary in a variety of situations, for example, a physical sensor state should be "readonly" since the client cannot modify the state of a sensor. The following members can be "readonly" or "writeonly": "property," "pipe," "wire," "memory."

If neither "readonly" nor "writeonly" is specified, the member is assumed to be "readwrite," meaning that the member can be both read and written. For pipes and wires, a client "readonly" member can only receive packets from the service, while a client "writeonly" member can only send packets to the service.

Pipes can be set "unreliable," meaning that packets may be dropped or arrive out of order. Normally pipe packets are delivered reliably and in order. Unreliable behavior may be desirable in situations where low latency of packet delivery is important rather than perfect reliability. The quality of service for packet delivery can be specified. For example, retry attempt count, send attempt timeout, and retry period values can be specified in a manner similar to SCTP in IETF RFC 3758 "Stream Control Transmission Protocol (SCTP) Partial Reliability Extensions." In general, the pipe will depend on the transport layer to handle any required retries, such as the capability described in IEEE RFC 3758.

Along with the "readonly," "writeonly," and "unreliable" modifiers, members can have more modifiers added in the future. These modifiers are included in a service definition after the declaration. For example, Table 1 illustrates member declarations and associated modifiers.

TABLE 1

| Member Type | Data Type | Member Name | Member Modifiers |
|---|---|---|---|
| Property | Double[ ] | Important_value | [readonly] |
| Pipe | Int32[ ] | Important_stream | [readonly, unreliable] |

It will be appreciated that variations of the above-disclosed and other features and functions, or alternatives thereof, may be desirably combined into many other different systems or applications. For example, in one embodiment a system for executing remote procedure calls between a client and a server comprises at least one client, the client comprising a machine with at least one processor and a storage device communicatively coupled to the at least one processor, the storage device storing instructions which, when executed by the at least one processor, cause the at least one processor to perform operations; at least one server in operable communication with the client, the server comprising a machine with at least one processor and a storage device communicatively coupled to the at least one processor, the storage device storing instructions which, when executed by the at least one processor, cause the at least one processor to perform operations; and a hierarchical communication architecture comprising: at least one channel, the channel providing a communication bridge between at least one client node and at least one server node, a message passing layer, the message passing layer passing messages comprising routing information and serialized data between at least one client endpoint associated with at least one client node and at least one server endpoint associated with the at least one server node for non-critical operations, and a remote procedure call layer comprising an augmented object-oriented interface overlaying the message passing layer, the remote procedure call layer comprising a client context endpoint associated with the client node and configured for identifying object references, processing transaction requests, and dispatching events received from the server node for latency sensitive operations.

In an embodiment, the remote procedure call layer further comprises an augmented object-oriented model comprising a plurality of defined member types, the defined member types comprising a function member, a property member, an event member, an object reference (objref) member, a pipe member, a callback member, a wire member, and a memory member.

In an embodiment, the property member is configured to get or set a variable value.

In an embodiment, a wire member is configured to communicate a most recent value between the server and at least one client with a best-effort delivery. In an embodiment, a PeekInValue is configured to read a current InValue at the client requested from the server, a PeekOutValue is configured to read a current OutValue for the client received by the server, and a PokeOutValue is configured to write the current OutValue for the client by requesting the server update the OutValue.

In an embodiment, the function member is configured to allow a function of zero or more parameters to be called by the at least one client with zero or one return values. In an embodiment, the event member is configured to allow the server to notify the at least one client with zero or more parameters. In an embodiment, the object reference (objref) member is configured to retrieve object references from the server.

In an embodiment, the pipe member is configured to allow the at least one client to request a pipe endpoint be created with a matching endpoint in the server in order to send/receive packets between endpoints, with at least one of a reliable in-order delivery and an unreliable best-effort delivery.

In an embodiment, the callback member is configured to allow the server to execute a function on the at least one client with zero or more parameters and zero or one return values. In an embodiment, the memory member is configured to allow the at least one client to read or write randomly accessible memory segments comprising at least one of fixed numbers and floating point numbers.

In an embodiment, the system further comprises providing service subscriptions between the client and server, the service subscriptions comprising at least one of: a Serviceinfo2Subscription, a ServiceSubscription, a PipeSubscription, and a WireSubscription.

In an embodiment, the system further comprises a filter with criteria comprising servicetypes and maxconnections. In an embodiment, the filter further comprises at least one of nodes, transportschemes, and predicate.

In an embodiment, the system further comprises a readonly modifier and a writeonly modifier, wherein the modifier can be applied to at least one of: a property member, a pipe member, wire members, and a memory member.

It should be understood that various presently unforeseen or unanticipated alternatives, modifications, variations or improvements therein may be subsequently made by those skilled in the art which are also intended to be encompassed by the following claims.

What is claimed is:

1. A system for executing remote procedure calls between a client and a server comprising:
    at least one client, said client comprising a machine with at least one processor and a storage device communicatively coupled to the at least one processor, the storage device storing instructions which, when executed by the at least one processor, cause the at least one processor to perform operations;
    at least one server in operable communication with said client, said server comprising a machine with at least one processor and a storage device communicatively coupled to the at least one processor, the storage device storing instructions which, when executed by the at least one processor, cause the at least one processor to perform operations; and
    a hierarchical communication architecture comprising:
        at least one channel, said channel providing a communication bridge between at least one client node and at least one server node;
        a message passing layer, said message passing layer passing messages comprising routing information and serialized data between at least one client endpoint associated with at least one client node and at least one server endpoint associated with at least one server node for non-critical operations;
        a remote procedure call layer comprising an augmented object-oriented interface overlaying said message passing layer, said remote procedure call layer further comprising an augmented object-oriented model comprising a plurality of defined member types, said defined member types comprising a function member, a property member, an event member, an object reference (objref) member, a pipe member, a callback member, a wire member, and a memory member, said remote procedure call layer comprising a client context endpoint associated with said client node and configured for identifying object references, processing transaction requests, and dispatching events received from said server node, for latency sensitive operations; and
    a readonly modifier and a writeonly modifier, wherein said readonly and writeonly modifier can be applied to at least one of: said property member, said pipe member, said wire member, and said memory member.

2. The system of claim 1 wherein said property member is configured to get a variable value or to set a variable value.

3. The system of claim 1 wherein said a wire member is configured to communicate a most recent value between said server and at least one client with a best-effort delivery.

4. The system of claim 3 further comprising:
    a PeekInValue configured to read a current InValue at the client requested from the server;
    a PeekOutValue configured to read a current OutValue for the client received by the server; and
    a PokeOutValue configured to write said current OutValue for the client by requesting the server update said OutValue.

5. The system of claim 1 wherein said function member is configured to allow a function of zero or more parameters to be called by said at least one client with zero or one return values.

6. The system of claim 1 wherein said event member is configured to allow said server to notify said at least one client with zero or more parameters.

7. The system of claim 1 wherein said object reference (objref) member is configured to retrieve object references from said server.

8. The system of claim 1 wherein said pipe member is configured to allow said at least one client to request a pipe endpoint be created with a matching endpoint in said server in order to send/receive packets between endpoints, with at least one of:
    a reliable in-order delivery; and
    an unreliable best-effort delivery.

9. The system of claim 1 wherein said callback member is configured to allow said server to execute a function on said at least one client with zero or more parameters and zero or one return value.

10. The system of claim 1 wherein said memory member is configured to allow said at least one client to read or write randomly accessible memory segments comprising at least one of:
    fixed numbers; and
    floating point numbers.

11. The system of claim 1 further comprising providing service subscriptions between the client and server, said service subscriptions comprising at least one of:
    a Serviceinfo2Subscription;
    a ServiceSubscription;
    a PipeSubscription; and
    a WireSubscription.

12. The system of claim 1 further comprising a filter with criteria comprising:
   servicetypes; and
   maxconnections.

13. The system of claim 12 wherein said filter further comprises at least one of:
   nodes;
   transportschemes; and
   predicate.

* * * * *